Nov. 10, 1931.   C. CONE   1,831,620
PROCESS AND APPARATUS FOR FORMING SHEET GLASS
Filed Nov. 30, 1929   2 Sheets-Sheet 1
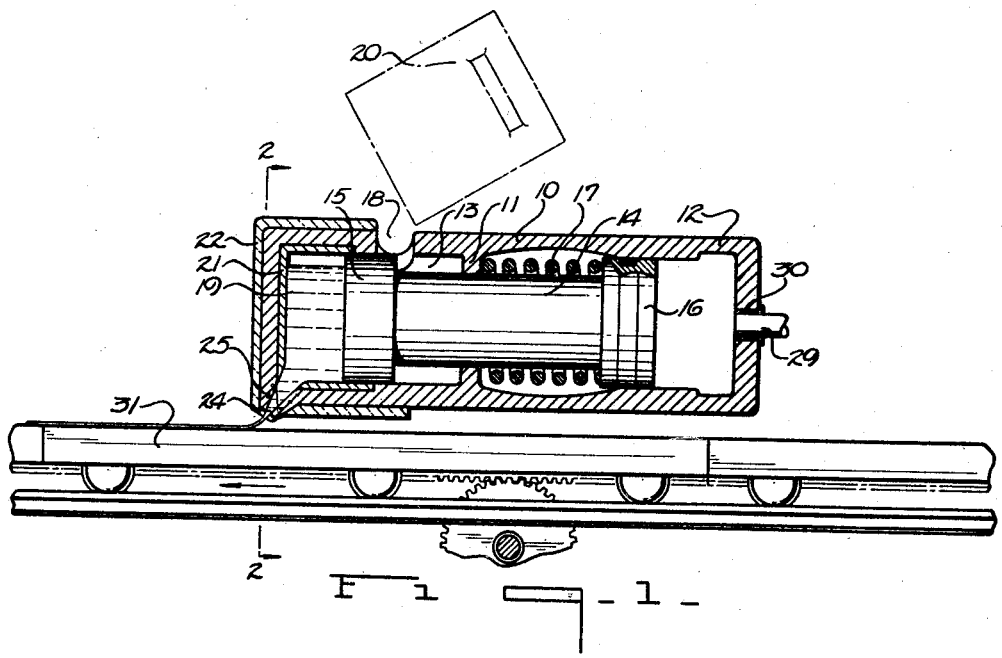
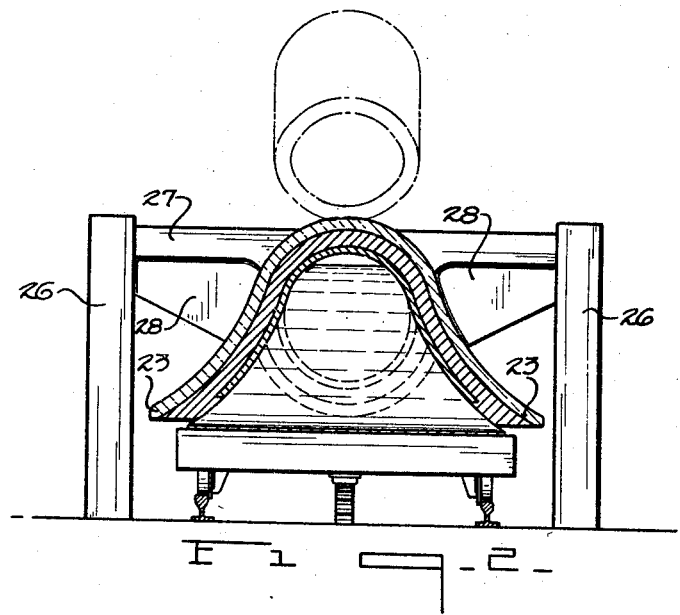
Inventor
Carroll Cone
By Frank Fraser,
Attorney

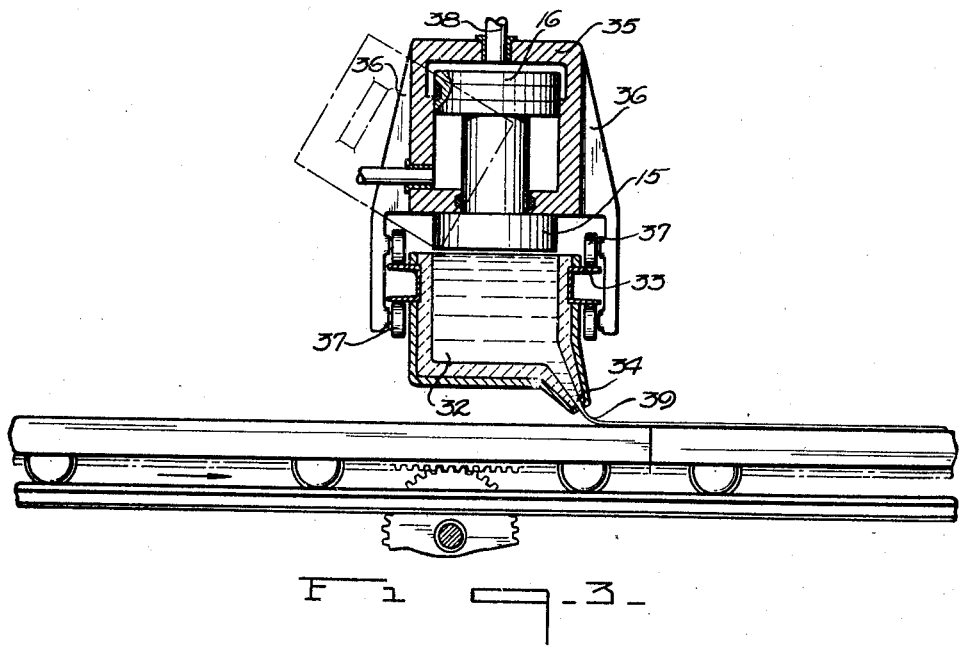
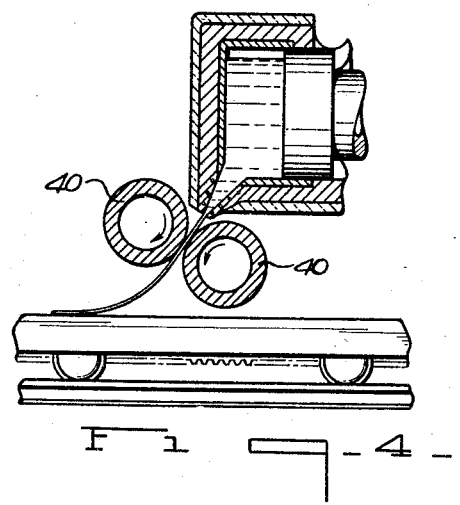

Patented Nov. 10, 1931

1,831,620

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING SHEET GLASS

Application filed November 30, 1929. Serial No. 410,720.

The present invention relates to a process and apparatus for forming sheet glass.

It is an object of the present invention to provide a means for forming sheet glass by exerting pressure on a mass or charge of molten glass while the same is in a plastic condition.

Another object of the invention is to provide means adapted to receive a mass of molten glass and means associated therewith and operable to extrude the glass therefrom in sheet form.

A further object of the invention is to provide a receptacle provided with a compartment to receive a mass of molten glass and a pressure chamber closely associated with the compartment and containing a means to extrude the glass from the compartment in sheet form of a substantially predetermined thickness.

Other objects and advantages of the invention will become more apparent during the course of the following description when taken in connection with the accompanying drawings.

In the drawings forming a part of this application and wherein like numerals are employed to designate like parts throughout the same, Fig. 1 is a side elevation in section of the new and improved sheet forming device, Fig. 2 is a sectional view taken on line 2—2 of Fig. 1, Fig. 3 is a vertical sectional view of a modified form of the device, and Fig. 4 is a partial view of another modified form.

The numeral 10 designates a substantially cylindrical casing having downwardly projecting members 11 dividing the casing into two compartments 12 and 13. Mounted in the casing 10 and adapted to slide between the two members 11 is a piston rod 14 having a head 15 on one end and a piston 16 on its opposite end. A compression spring 17 normally retains the piston in a closed position.

The compartment 13 has an opening 18 therein through which a mass of molten glass 19 is deposited from a pot or other receptacle 20. The compartment in which the batch of molten glass is deposited is heated in any suitable manner and has an inner-lining 21 and an outer-lining 22 of carborundum or any other suitable material.

For gauging the sheet for proper thickness and width, one end of the casing 10 is flared outwardly substantially the entire width of the sheet to be formed as indicated at 23 in Fig. 2 of the drawings. This forms a bell-shaped end through which the molten glass is extruded into sheet form. The casing 10 and the flared portions 23 taper downwardly to form a sheet forming pass 24 of a substantial thickness. Heating members 25 are provided to maintain the temperature of the glass being extruded at an even temperature and to prevent freezing of the glass in the forming slot between casts.

Any means may be used for supporting the casing and there is shown in Fig. 2 of the drawings one form of construction which may be used, which consists of vertical members 26 and a horizontal cross member 27 connecting the vertical members and having brackets 28 to which the casing is attached.

For operating the piston to move the head into the molten glass compartment for extruding the glass in sheet form, any pressure means might be used but it is preferred to use hydraulic means and liquid is admitted to the chamber 12 through the medium of the pipe 29 which is secured to the casing 10 and a tight connection is made thereto through the bushing 30.

Thus, it will be seen in the operation of the device that as the pot of molten glass is deposited in the compartment 13, the piston 16 will be in an inoperative position, and the compression spring 17 will be relaxed. After the pot is deposited into the compartment, the opening 18 is closed and liquid under pressure is admitted into the chamber 12 through means of the pipe 29, forcing the piston 16 forward, carrying therewith the head 15 which exerts a pressure against the molten glass, thereby extruding the glass through the sheet forming pass 24 into a sheet of substantially predetermined thickness. It is necessary in the forming of a sheet in this manner, that a speedy operation be performed before the glass has had a chance to become chilled and to this end it is necessary that a great pressure be exerted upon the piston 16.

After the sheet is extruded through the sheet forming pass 17, it is deposited upon forwardly moving cars 31 or other conveying means and carried forward to be suitably annealed. One form of means for conveying the glass is disclosed although it is perfectly obvious that any means may be used in connection with the present invention.

In the modified form of the device as disclosed in Fig. 3 of the drawings, the receptacle 32 is suspended from a trackway 33. The receptacle 32 is constructed and heated by the same materials as in the preferred form and has the tapered end to form a sheet forming pass 34.

Suspended above the receptacle 32 and adapted to ride upon the track 33 is the pressure chamber 35. Depending from the pressure chamber 35 are a pair of arms 36 carrying members 37 adapted to engage the track 33. The arrangement of the piston and means for operating the same is identical to that in the preferred form. In use, before the pot of molten glass can be deposited into the receptacle 32, it is necessary that the pressure chamber 35 be moved backward so as to allow for the depositing of a sufficient amount of glass. This is accomplished by means of the trackway 33 and the members 37. The pressure chamber is then brought forward directly over the receptacle 32 containing the mass of molten glass, and liquid under pressure is admitted through the pipe 38 forcing the piston 16 and head 15 against the mass of molten glass and extruding the sheet 39 therefrom. The sheet is then conveyed forward in the manner as hereinabove described.

In the form of the device shown in Fig. 4 of the drawings, there is provided a pair of sheet forming rolls 40 directly in front of the sheet forming pass so that as the sheet is extruded from the receptacle, it passes between the rolls 40 and is rolled to proper thickness thereby. It is understood that the sheet forming rolls might be used with either of the forms disclosed.

It is quite essential before the pot of molten glass is deposited in the casing, that the glass receiving compartment be of a temperature substantially the same as that of the glass deposited so as not to unnecessarily chill the glass. The formation of the sheet may then be accomplished with a minimum of labor.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus of the character described, comprising a receptacle adapted to receive a mass of molten glass, a sheet forming pass at the base of said receptacle, a hydraulic plunger, means for moving said plunger laterally into and out of operative relation with respect to said receptacle, and means for operating said plunger for extruding the molten glass through the sheet forming pass into sheet form when said plunger is moved into operative relation with respect to said receptacle.

2. In sheet glass apparatus, a substantially cylindrical receptacle adapted to receive a mass of molten glass, an outwardly flared sheet forming pass at one end of said receptacle, and means for extruding the molten glass through the sheet forming pass.

3. In sheet glass apparatus, a substantially cylindrical receptacle adapted to receive a mass of molten glass and having an outwardly flared sheet forming pass at one end thereof, a hydraulic plunger slidable in said receptacle, and means for sliding said plunger for extruding the molten glass through the sheet forming pass into sheet form.

4. In sheet glass apparatus, conveying means for receiving a newly formed sheet of glass thereupon and for carrying the same forwardly in a definite substantially horizontal path, a receptacle positioned above the conveying means and adapted to receive a charge of molten glass therein, said receptacle having an outlet constituting a sheet forming pass, and means mounted above said receptacle and movable laterally with respect thereto either to a position at one side thereof or to a position over the same, said last named means being operable when in a position over the receptacle to force the molten glass therefrom through the sheet forming pass onto said conveying means.

5. In sheet glass apparatus, conveying means for receiving a newly formed sheet of glass thereupon and for carrying the same fowardly in a definite substantially horizontal path, a receptacle positioned above the conveying means and adapted to receive a charge of molten glass therein, said receptacle having an outlet constituting a sheet forming pass, a vertically movable plunger mounted above said receptacle and movable laterally with respect thereto either to a position at one side thereof or to a position over the same, and means for actuating said plunger when it is moved to a position over the receptacle to force the molten glass therefrom through the sheet forming pass onto said conveying means.

6. In sheet glass apparatus, conveying means for receiving a newly formed sheet of glass thereupon and for carrying the same forwardly in a substantially horizontal path, spaced tracks mounted above the conveying means and extending transversely with respect thereto, a receptacle positioned between the tracks and suspended therefrom, said receptacle being adapted to receive a charge of molten glass and having an outlet constituting a sheet forming pass, a pressure chamber mounted upon said tracks and movable along the same either to a position above the receptacle or to a position at one side thereof, a vertically movable plunger carried by the pressure chamber, and means for actuating said plunger when the said pressure chamber is moved to a position above the receptacle to force the molten glass from the latter through the sheet forming pass onto the said conveying means.

7. In sheet glass apparatus, a substantially horizontally disposed substantially cylindrical casing, partition means within the casing intermediate its ends dividing the interior thereof into a pressure compartment and a glass receiving compartment, said glass receiving compartment being flared outwardly at one end and provided with an opening constituting a sheet forming pass, a horizontally disposed plunger slidable through said partition means within said casing and having a head at one end disposed within the glass receiving compartment and a piston at the opposite end disposed within the pressure compartment, a compression spring encircling the plunger within the pressure compartment and normally tending to move the same rearwardly, and means for forcing the plunger forwardly against the action of the spring whereby the glass is forced from the glass receiving compartment through the sheet forming pass in sheet form.

Signed at Toledo, in the county of Lucas and State of Ohio, this 27th day of November, 1929.

CARROLL CONE.